United States Patent
Asano et al.

(10) Patent No.: US 10,950,896 B2
(45) Date of Patent: Mar. 16, 2021

(54) NONAQUEOUS ELECTROLYTE SOLUTION, NONAQUEOUS ELECTROLYTE SECONDARY BATTERY, AND METHOD OF PRODUCING NONAQUEOUS ELECTROLYTE SECONDARY BATTERY

(71) Applicants: TOYOTA JIDOSHA KABUSHIKI KAISHA, Toyota (JP); Daikin Industries, Ltd., Osaka (JP)

(72) Inventors: Hiroto Asano, Nissin (JP); Toshiyuki Kawai, Nagoya (JP); Shinpei Kondo, Nagoya (JP); Shigeaki Yamazaki, Osaka (JP); Shinichi Kinoshita, Osaka (JP)

(73) Assignees: TOYOTA JIDOSHA KABUSHIKI KAISHA, Toyota (JP); DAIKIN INDUSTRIES, LTD., Osaka (JP)

( * ) Notice: Subject to any disclaimer, the term of this patent is extended or adjusted under 35 U.S.C. 154(b) by 14 days.

(21) Appl. No.: 15/834,235

(22) Filed: Dec. 7, 2017

(65) Prior Publication Data
US 2018/0183105 A1    Jun. 28, 2018

(30) Foreign Application Priority Data
Dec. 26, 2016    (JP) .................. 2016-251642

(51) Int. Cl.
H01M 10/0569    (2010.01)
H01M 10/0567    (2010.01)
H01M 10/0525    (2010.01)
H01M 10/0568    (2010.01)
H01M 10/04      (2006.01)
H01M 10/05      (2010.01)

(52) U.S. Cl.
CPC ....... *H01M 10/0569* (2013.01); *H01M 10/04* (2013.01); *H01M 10/05* (2013.01); *H01M 10/0525* (2013.01); *H01M 10/0567* (2013.01); *H01M 10/0568* (2013.01); *H01M 2300/0037* (2013.01)

(58) Field of Classification Search
CPC ......... H01M 10/0569; H01M 10/0567; H01M 10/05; H01M 2300/0037; H01M 10/0525; H01M 10/04
See application file for complete search history.

(56) References Cited

U.S. PATENT DOCUMENTS

2007/0224516 A1   9/2007   Deguchi et al.
2010/0035162 A1   2/2010   Chiga et al.
2010/0081062 A1   4/2010   Chiga et al.
2012/0219866 A1   8/2012   Onuki et al.
2013/0130128 A1   5/2013   Okamoto et al.
2013/0266847 A1  10/2013   Noguchi et al.
2014/0248529 A1   9/2014   Chen et al.
2014/0322615 A1  10/2014   Uehara et al.
2015/0380769 A1  12/2015   Chiga et al.
2016/0285131 A1   9/2016   Yamauchi et al.
2016/0308252 A1  10/2016   Iriyama et al.
2017/0040608 A1   2/2017   Asano et al.
2018/0183097 A1   6/2018   Yamazaki et al.

FOREIGN PATENT DOCUMENTS

| CN | 101030661 A | 9/2007 |
|---|---|---|
| CN | 105556729 A | 5/2016 |
| JP | 2005-317446 A | 11/2005 |
| JP | 2007-250415 A | 9/2007 |
| JP | 2008-257988 A | 10/2008 |
| JP | 2009-289414 A | 12/2009 |
| JP | 2010-062132 A | 3/2010 |
| JP | 5115109 B2 | 1/2013 |
| JP | 2015-179680 A | 10/2015 |
| JP | 2015-191738 A | 11/2015 |
| JP | 2016-027548 A | 2/2016 |
| JP | 2016-519400 A | 6/2016 |
| KR | 10-2015-0138326 A | 12/2015 |
| WO | 2011025016 A1 | 3/2011 |
| WO | 2012017999 A1 | 2/2012 |
| WO | 2012077712 A1 | 6/2012 |
| WO | 2014/165748 A1 | 10/2014 |

OTHER PUBLICATIONS

U.S. Appl. No. 15/841,616, filed Dec. 14, 2017.
Kazuya Sato et al: "Mixed Solvent Electrolytes Containing Fluorinated Carboxylic Acid Esters to Improve the Thermal Stability of Lithium Metal Anode Cells", Solid State Ionics, vol. 148 (2002), pp. 463-466. (4 pages total).
R. Chandrasekaran et al: "Effect of Fluoroadditives on the Electrode Characteristics of Graphite for Secondary Lithium Battery", Journal of New Materials for Electrochemical Systems 9, 2006, pp. 181-189. (9 pages total).
Yamaki et al., "Thermal studies of fluorinated ester as a novel candidate for electrolyte solvent of lithium metal anode rechargeable cells", Journal of Power Sources, vol. 102, 2001, pp. 288-293 (6 pages).
Communication dated Jan. 27, 2020 from the United States Patent and Trademark Office in U.S. Appl. No. 15/841,616.
Communication dated Jun. 29, 2020, issued by the U.S. Patent and Trademark Office in U.S. Appl. No. 15/841,616.
Notice of Allowance dated Oct. 19, 2020 from the United States Patent and Trademark Office in U.S. Appl. No. 15/841,616.

*Primary Examiner* — Laura Weiner
(74) *Attorney, Agent, or Firm* — Sughrue Mion, PLLC

(57) ABSTRACT

A nonaqueous electrolyte solution used for a nonaqueous electrolyte secondary battery includes a cyclic carbonate and a fluorinated carboxylate ester including two fluorine atoms on an alpha carbon atom derived from a carboxylic acid as a nonaqueous solvent.

13 Claims, 1 Drawing Sheet

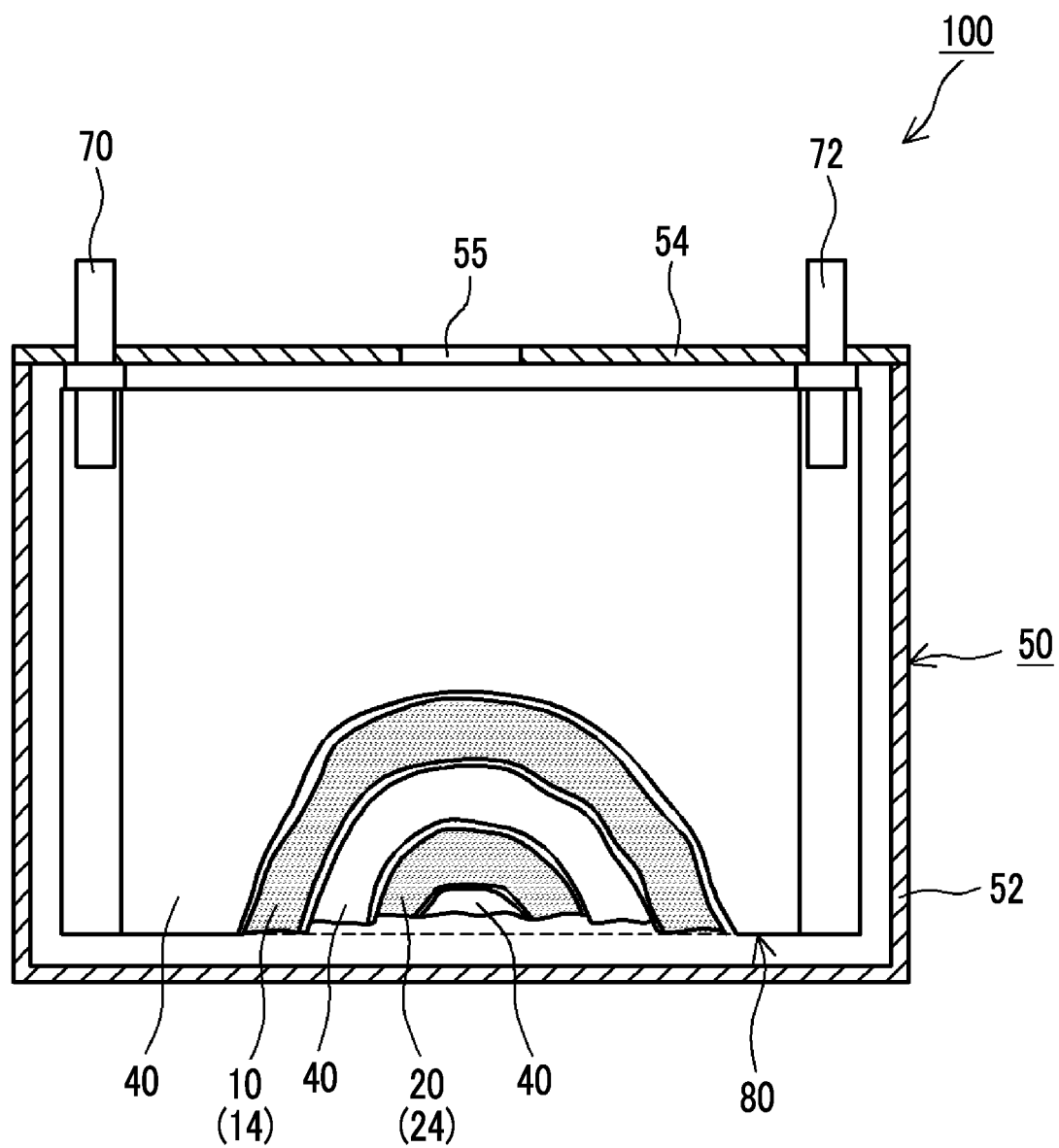

NONAQUEOUS ELECTROLYTE SOLUTION, NONAQUEOUS ELECTROLYTE SECONDARY BATTERY, AND METHOD OF PRODUCING NONAQUEOUS ELECTROLYTE SECONDARY BATTERY

INCORPORATION BY REFERENCE

The disclosure of Japanese Patent Application No. 2016-251642 filed on Dec. 26, 2016 including the specification, drawings and abstract is incorporated herein by reference in its entirety.

BACKGROUND

1. Technical Field

The present disclosure relates to a nonaqueous electrolyte solution, a nonaqueous electrolyte secondary battery, and a method of producing a nonaqueous electrolyte secondary battery.

2. Description of Related Art

Lithium ion secondary batteries and other nonaqueous electrolyte secondary batteries are smaller, lighter, and have a higher energy density than batteries of the related art and have an excellent output density. Due to such advantages, in recent years, such batteries have been preferably used as a power supply for driving a vehicle such as a hybrid vehicle and an electric vehicle. In general, an electrolyte solution used for this type of nonaqueous electrolyte secondary battery preferably has an oxidation resistance characteristic. In other words, an electrolyte solution having a wide potential window is preferable.

As an electrolyte solution used for a nonaqueous electrolyte secondary battery, a solution in which a supporting salt such as a lithium salt is dissolved in a carbonate-based solvent such as ethylene carbonate, propylene carbonate, or diethyl carbonate is used. Meanwhile, in order to further improve performance such as increasing an energy density of a secondary battery, an electrolyte solution in which a solvent that is less likely to be oxidized than such a carbonate-based solvent is used is desirable. Use of a fluorinated solvent as a solvent that is less likely to be oxidized than a carbonate-based solvent has been studied. A fluorinated solvent is a solvent in which fluorine atoms are introduced into molecules. As technical literature regarding an electrolyte solution using a fluorinated solvent, Japanese Unexamined Patent Application Publication No. 2016-027548 (JP 2016-027548 A) may be exemplified.

SUMMARY

In JP 2016-027548 A, use of a solvent mixture containing a methyl fluorinated propionate and a fluorinated cyclic carbonate as a nonaqueous solvent of a nonaqueous electrolyte solution in a nonaqueous electrolyte secondary battery including a positive electrode, a negative electrode, and a nonaqueous electrolyte solution has been proposed. In this literature, it is described that such a configuration makes it possible to prevent side reactions during charge storage. However, according to studies by the inventors, a fluorinated solvent in which fluorine atoms are introduced into solvent molecules has disadvantages that viscosity is likely to increase and conductivity of a nonaqueous electrolyte solution is likely to decrease. A nonaqueous electrolyte solution in which oxidation resistance of a nonaqueous electrolyte solution is able to be increased and which realizes high conductivity is desirable.

The present disclosure provides a nonaqueous electrolyte solution having excellent oxidation resistance and capable of realizing high conductivity. In addition, other objects of the present disclosure are to provide a nonaqueous electrolyte secondary battery including such a nonaqueous electrolyte solution and a method of producing the nonaqueous electrolyte secondary battery.

The inventors searched for a fluorinated solvent capable of realizing high conductivity when included in a nonaqueous electrolyte solution. As a result, the inventors have found that, when a combination of a fluorinated carboxylate ester having a specific fluorination rate and fluorination positions with respect to an ester skeleton and a cyclic carbonate is used, high conductivity can be realized and completed the present disclosure.

A first aspect of the present disclosure relates to a nonaqueous electrolyte solution used for a nonaqueous electrolyte secondary battery. The nonaqueous electrolyte solution includes a cyclic carbonate and a fluorinated carboxylate ester ($XCF_2COOR$) including two fluorine atoms on an alpha carbon atom ($1^{st}$ neighboring carbon atom from COOR) derived from a carboxylic acid as a nonaqueous solvent. When such a combination of a fluorinated carboxylate ester including two fluorine atoms on the alpha carbon atom derived from a carboxylic acid in a carboxylate ester and a cyclic carbonate is used, it is possible to further improve oxidation resistance and conductivity of the nonaqueous electrolyte solution.

Further, in the first aspect of the present disclosure, the content ratio (fluorinated carboxylate ester:cyclic carbonate) between the fluorinated carboxylate ester and the cyclic carbonate may be 50:50 to 95:5 on a volume basis. When the content ratio between the fluorinated carboxylate ester and the cyclic carbonate is in such a range, an effect of improving conductivity of the nonaqueous electrolyte solution may be exhibited more suitably.

The first aspect of the present disclosure may further include a first compound (compound A) represented by the following general formula (A) as the fluorinated carboxylate ester. When such a first compound is included, it is possible to further improve conductivity of the nonaqueous electrolyte solution.

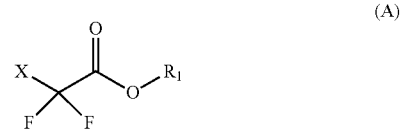

(A)

—$R_1$ in the first compound may be selected from among the group consisting of —$CH_3$, —$CH_2CH_3$, —$CF_2H$, —$CFH_2$, —$CF_3$, —$CH_2CF_3$, —$CH_2CF_2H$, —$CH_2CFH_2$, —$CFHCF_3$, —$CFHCF_2H$, —$CFHCFH_2$, —$CF_2CF_3$, —$CF_2CF_2H$, and —$CF_2CFH_2$. —X may be selected from among the group consisting of —H, —$CF_2H$, —$CFH_2$, and —$CH_3$.

The first aspect of the present disclosure may further include a second compound (a compound B) represented by the following general formula (B) as the cyclic carbonate. When the second compound is included, it is possible to further improve conductivity of the nonaqueous electrolyte solution.

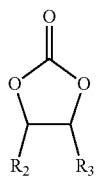

(B)

Here, $R_2$ and $R_3$ in the second compound may be same or different substituents, and each of $R_2$ and $R_3$ in the second compound may be independently selected from the group consisting of a hydrogen atom, a fluorine atom, an alkyl group, and an alkyl group including fluorine atoms.

The first aspect of the present disclosure may further include a third compound (a compound C) represented by the following general formula (C) and a fourth compound (a compound D) represented by the following general formula (D) as an additive. When a combination of the third compound and the fourth compound is included in the nonaqueous electrolyte solution, it is possible to further improve cycle durability of the secondary battery produced using the nonaqueous electrolyte solution.

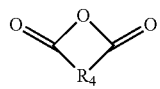

(C)

Here, $R_4$ in the third compound may be an alkylene group including two to eight carbon atoms or an alkylene group including substituents and including two to eight carbon atoms.

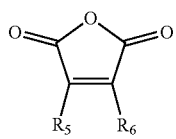

(D)

Here, each of $R_5$ and $R_6$ in the fourth compound may be independently selected from the group consisting of a hydrogen atom, a fluorine atom, an alkyl group, an alkyl group including fluorine atoms and an aryl group. Alternatively, $R_5$ and $R_6$ may be bonded to each other to form an aromatic ring or an aliphatic ring.

The first aspect of the present disclosure may further include any of $CHF_2COOCH_3$, $CH_3CF_2COOCH_3$, $CFH_2CF_2COOCH_3$, $CF_2HCF_2COOCH_3$, $CHF_2COOC_2H_5$, $CH_3CF_2COOC_2H_5$, $CFH_2CF_2COOC_2H_5$, $CF_2HCF_2COOC_2H_5$, and $CHF_2COOCH_3$ as the fluorinated carboxylate ester.

The first aspect of the present disclosure may further include $CHF_2COOCH_3$ as the fluorinated carboxylate ester.

The first aspect of the present disclosure may further include any of ethylene carbonate, monofluoroethylene carbonate, propylene carbonate, ethyl ethylene carbonate, (fluoromethyl)ethylene carbonate, (trifluoromethyl)ethylene carbonate, and 1,2-difluoroethylene carbonate as the cyclic carbonate.

Further, in the first aspect of the present disclosure, the third compound may be succinic anhydride and the fourth compound may be maleic anhydride.

The first aspect of the present disclosure may further include any of lithium difluoro(oxalato)borate and lithium bis(oxalato)borate as the additive.

A second aspect of the present disclosure relates to a nonaqueous electrolyte secondary battery including a positive electrode, a negative electrode, and a nonaqueous electrolyte solution. The nonaqueous electrolyte solution included in the nonaqueous electrolyte secondary battery includes a cyclic carbonate and a fluorinated carboxylate ester including two fluorine atoms on an alpha carbon atom derived from a carboxylic acid as a nonaqueous solvent. In the nonaqueous electrolyte secondary battery including such a configuration, the nonaqueous electrolyte solution is possible to have high conductivity and high performance.

Further, in the second aspect of the present disclosure, the content ratio (fluorinated carboxylate ester:cyclic carbonate) between the fluorinated carboxylate ester and the cyclic carbonate may be 50:50 to 95:5 on a volume basis. When the content ratio between the fluorinated carboxylate ester and the cyclic carbonate is in such a range, for example, it is possible to realize a secondary battery having low initial resistance and high performance.

The second aspect of the present disclosure may further include a first compound as the fluorinated carboxylate ester. When such a first compound is included in the nonaqueous electrolyte solution, it is possible to realize a secondary battery having higher performance.

The second aspect of the present disclosure may further include the second compound as the cyclic carbonate. When the compound B is included in the nonaqueous electrolyte solution, for example, it is possible to realize a secondary battery having low initial resistance and high performance.

A third aspect of the present disclosure relates to a method of producing a nonaqueous electrolyte secondary battery. The production method includes a process of producing a battery assembly. The battery assembly is produced by accommodating a positive electrode and a negative electrode in a battery case together with a nonaqueous electrolyte solution. The nonaqueous electrolyte solution accommodated in the battery assembly includes a nonaqueous solvent and an additive. As the nonaqueous solvent, a fluorinated carboxylate ester including a cyclic carbonate and two fluorine atoms on an alpha carbon atom derived from a carboxylic acid are included. The additive includes the third compound and the fourth compound. In addition, the method includes an initial charging process in which initial charging process is performed on the battery assembly. When the production method is used, for example, it is possible to produce a secondary battery having low initial resistance, excellent cycle durability, and high performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram schematically showing a lithium ion secondary battery according to an embodiment.

DETAILED DESCRIPTION OF EMBODIMENTS

Embodiments of the present disclosure will be described below with reference to the drawings appropriately. Here, the sizes (a length, a width, a thickness, and the like) in the drawings do not reflect actual sizes. In addition, components other than those particularly mentioned in this specification that are necessary for implementation of the present disclosure, for example, general technologies related to battery production such as a configuration and a production method of an electrode body including a positive electrode and a negative electrode, a configuration and a production method of a separator, and the shape of a battery (case), can be recognized by those skilled in the art as design matters based on the related art in the field. The present disclosure can be implemented based on content disclosed in this specification and common general technical knowledge in the field.

Here, in this specification, a nonaqueous electrolyte secondary battery refers to a secondary battery including a nonaqueous electrolyte solution. The nonaqueous electrolyte solution is typically an electrolyte solution containing a supporting salt (supporting electrolyte) in a nonaqueous solvent. In addition, a lithium ion secondary battery refers to a secondary battery in which lithium ions are used as electrolyte ions, and charging and discharging are performed due to movement of lithium ions between positive and negative electrodes. In addition, an electrode active material refers to a material capable of reversibly occluding and releasing chemical species serving as charge carriers. The charge carriers are lithium ions in the lithium ion secondary battery. While the nonaqueous electrolyte solution used for the lithium ion secondary battery will be described below, this is not intended to limit the objects of the present disclosure.

<Nonaqueous Electrolyte Solution>

A nonaqueous electrolyte solution according to a preferable aspect of the technology disclosed here is a nonaqueous electrolyte solution used for a lithium ion secondary battery. The nonaqueous electrolyte solution is typically in a liquid state at normal temperature such as 25° C., and is preferably in a liquid state constantly in a working temperature range such as −20° C. to 60° C. As the nonaqueous electrolyte solution, a solution in which a supporting salt is dissolved or dispersed in a nonaqueous solvent can be suitably used. The supporting salt is, for example, a lithium salt in a lithium ion secondary battery, and the same supporting salt as in a general lithium ion secondary battery can be appropriately selected and used. For example, lithium salts such as $LiPF_6$, $LiBF_4$, $LiClO_4$, $LiAsF_6$, $Li(CF_3SO_2)_2N$, $LiN(FSO_2)_2$, and $LiCF_3SO_3$ can be used. Among these, $LiPF_6$ can be suitably used. The concentration of the supporting salt is adjusted to be preferably within a range of 0.5 mol/L to 3.0 mol/L and more preferably 0.5 mol/L to 2.0 mol/L.

<Fluorinated Carboxylic Acid Ester>

The nonaqueous electrolyte solution disclosed here includes a fluorinated carboxylic acid ester (fluorinated carboxylate ester) having two fluorine atoms on the alpha carbon atom derived from a carboxylic acid and a cyclic carbonate as a nonaqueous solvent. The fluorinated carboxylic acid ester is a compound represented by the general formula $XCF_2COOR$ in which two hydrogen atoms (H) directly bonded to the alpha carbon atom derived from a carboxylic acid are substituted with a fluorine atom (F). When a combination of a fluorinated methyl acetate having two fluorine atoms on a specific carbon atom in a carboxylic acid ester and a cyclic carbonate is used, it is possible to further improve oxidation resistance and conductivity of the nonaqueous electrolyte solution. The reasons why such effects are obtained need not be considered to be limited, but, for example, can be conceived to be the following. That is, in the cyclic carbonate, when cations such as lithium are coordinated in the cyclic carbonate, a supporting salt in the electrolyte solution is likely to be dissociated into cations and anions. On the other hand, when a fluorinated carboxylic acid ester having fluorine atoms is used in combination therewith in order to increase oxidation resistance and the like, the viscosity of the electrolyte solution is likely to increase. Therefore, the increase in viscosity outweighs the dissociation of the electrolyte solution, and conductivity is likely to decrease. On the other hand, a fluorinated carboxylic acid ester having two fluorine atoms on the alpha carbon atom derived from a carboxylic acid has high compatibility with the cyclic carbonate and has favorable diffusibility, and viscosity is unlikely to increase even when used in combination with the cyclic carbonate. It is thought that these contribute to increasing conductivity.

The fluorinated carboxylic acid ester is not particularly limited as long as it has two fluorine atoms on the alpha carbon atom derived from a carboxylic acid. For example, the total number of carbon atoms in the fluorinated carboxylic acid ester is typically 3 to 15, and in order to prevent the viscosity from increasing, is preferably 3 to 10, more preferably 3 to 8, and most preferably 3 to 5. In addition, the number of fluorine atoms in the fluorinated carboxylic acid ester is not particularly limited as long as two or more fluorine atoms are included in one molecule in order to increase oxidation resistance and the like. The number of fluorine atoms is typically 2 to 20, preferably 2 to 15, more preferably 2 to 8, and most preferably 2 to 5. As the fluorinated carboxylic acid ester, further, a fluorinated carboxylic acid ester in which one or more hydrogen atoms bonded to carbon atoms constituting a main chain each are independently substituted with a substituent other than a fluorine atom may be used. As a preferable example of the fluorinated carboxylic acid ester, a compound A represented by the following general formula (A) may be exemplified.

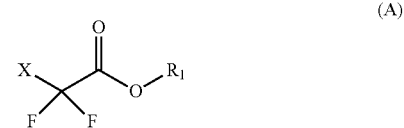

(A)

Here, in the compound A, $-R_1$ is selected from the group consisting of $-CH_3$, $-CH_2CH_3$, $-CF_2H$, $-CFH_2$, $-CF_3$, $-CH_2CF_3$, $-CH_2CF_2H$, $-CH_2CFH_2$, $-CFHCF_3$, $-CFHCF_2H$, $-CFHCFH_2$, $-CF_2CF_3$, $-CF_2CF_2H$, and $-CF_2CFH_2$. $-X$ is selected from the group consisting of $-H$ (hydrogen atom), $-CF_2H$, $-CFH_2$, and $-CH_3$. Among these, in order for an effect due to the compound A to be exhibited suitably, $CHF_2COOCH_3$, $CH_3CF_2COOCH_3$, $CFH_2CF_2COOCH_3$, $CF_2HCF_2COOCH_3$, $CHF_2COOC_2H_5$, $CH_3CF_2COOC_2H_5$, $CFH_2CF_2COOC_2H_5$, and $CF_2HCF_2COOC_2H_5$ are preferable, and $CHF_2COOCH_3$ (methyl difluoroacetate: MDFA) in which $R_1$ is $CH_3$ and X is a hydrogen atom is particularly preferable.

The content ratio (volume basis) between the fluorinated carboxylic acid ester and the cyclic carbonate is not particularly limited. In order to exhibit effects more effectively due to combined use of the fluorinated carboxylic acid ester and the cyclic carbonate, the volume ratio between the fluorinated carboxylic acid ester and the cyclic carbonate (fluorinated carboxylic acid ester:cyclic carbonate) is suitably 50:50 to 95:5, preferably 60:40 to 95:5, and more preferably 70:30 to 95:5. In order to obtain high conductivity and the like, when the content of the fluorinated carboxylic acid ester is set to that of the content of the cyclic carbonate or more, this is effective. The technology disclosed here can be preferably realized in a form in which the volume ratio between the fluorinated carboxylic acid ester and the cyclic carbonate is, for example, 80:20 to 90:10.

<Cyclic Carbonate>

As the cyclic carbonate used in combination with the fluorinated carboxylic acid ester, various cyclic carbonates known to be used as a nonaqueous solvent in a nonaqueous electrolyte solution of a lithium ion secondary battery can be used without particular limitation. For example, ethylene carbonate (EC; $C_3H_4O_3$: 1,3-dioxolan-2-one), propylene carbonate (PC), butylene carbonate (BC), pentylene carbonate, vinylene carbonate (VC), or derivatives thereof may be suitably used. Among these, EC having a high dielectric constant and derivatives thereof are desirably used. As a preferable example of EC and derivatives thereof, a compound B represented by the following general formula (B) may be exemplified.

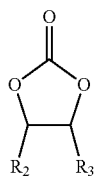

(B)

Here, in the compound B, $R_2$ and $R_3$ are the same or different substituents, and each independently selected from the group consisting of a hydrogen atom, a fluorine atom, and an alkyl group optionally substituted with fluorine atoms. That is, in a preferable aspect, in an ethylene carbonate derivative, one or two of four hydrogen atoms (H) directly bonded to carbon atoms constituting a heterocycle (5-membered ring) of EC are substituted with a fluorine atom or an alkyl group optionally substituted with fluorine atoms. Here, in this specification, the ethylene carbonate derivative is a concept including geometric isomers thereof. In addition, substitution positions of $R_2$ and $R_3$ of the ethylene carbonate derivative are independently position 1 or 2.

In the compound B, at least one of the two substituents $R_2$ and $R_3$ on carbon atoms constituting a heterocycle, for example, both, may be an alkyl group optionally substituted with fluorine atoms. $R_2$ and $R_3$ may be linear or branched. In order to decrease the viscosity of the nonaqueous electrolyte solution and increase conductivity and the like, a compound B in which the total number of carbon atoms of $R_2$ and $R_3$ is 1 to 12 can be preferably used. In addition, a compound B in which the total number of carbon atoms of $R_2$ and $R_3$ is 1 to 6, and typically 1 to 4, for example, 1 or 2, can be used. When the number of carbon atoms is too large, the viscosity of the nonaqueous electrolyte solution may increase and ion conductivity may decrease. For the same reason, usually, an alkyl group is preferably linear. For example, $R_2$ and $R_3$ may be an alkyl group having 1 to 6 carbon atoms. In addition, $R_2$ and $R_3$ may be an alkyl group having 1 to 4 carbon atoms, and typically 1 or 2 carbon atoms. As the alkyl group having 1 to 6 carbon atoms, for example, a methyl group, an ethyl group, an n-propyl group, an isopropyl group, an n-butyl group, an isobutyl group, a sec-butyl group, a t-butyl group, an n-pentyl group, a 1-methylbutyl group, a 2-methylbutyl group, a 3-methylbutyl group, a 1-methyl-2-methylpropyl group, a 2,2-dimethylpropyl group, and a hexyl group may be exemplified. In addition, in order to increase oxidation resistance and the like, a group having a structure in which one or more hydrogen atoms of an alkyl chain skeleton are substituted with a fluorine atom, that is, a fluorinated alkyl group having 1 to 6 carbon atoms, may be used. A fluorinated alkyl group in which a hydrogen atom bonded to a terminal carbon atom in an alkyl chain skeleton is substituted with a fluorine atom is preferable. When a fluorinated alkyl group is used, the number of fluorine atoms is not particularly limited as long as one or more fluorine atoms are included in the alkyl chain skeleton, and is suitably 1 to 12, and may be 1 to 7, for example, 1 to 5, and typically 1 to 3.

As one preferable example of the compound B, a structure in which one of $R_2$ and $R_3$ is a hydrogen atom and the other is a fluorine atom, a structure in which one of $R_2$ and $R_3$ is a hydrogen atom and the other is an alkyl group having 4 carbon atoms or less, a structure in which one of $R_2$ and $R_3$ is a hydrogen atom and the other is a fluorinated alkyl group having 4 carbon atoms or less, a structure in which both $R_2$ and $R_3$ are a hydrogen atom and the like may be exemplified. As a specific example of the compound B, ethylene carbonate (EC), monofluoroethylene carbonate (MFEC), propylene carbonate (PC), ethyl ethylene carbonate, (fluoromethyl) ethylene carbonate (FPC), (difluoromethyl)ethylene carbonate (DFPC), and (trifluoromethyl)ethylene carbonate (TFPC) may be exemplified. Among these, in order for an effect due to the compound B such as an increase in conductivity to be exhibited suitably, EC, MFEC, PC, FPC, and TFPC are preferable.

As one preferable example of the compound B, a structure in which one of $R_2$ and $R_3$ is a fluorine atom and the other is an alkyl group having 4 carbon atoms or less, a structure in which one of $R_2$ and $R_3$ is a fluorine atom and the other is a fluorinated alkyl group having 4 carbon atoms or less, a structure in which both $R_2$ and $R_3$ are a fluorine atom and the like may be exemplified. As a specific example of the compound B, 1,2-difluoroethylene carbonate (DFEC), 1-fluoro-2-methylethylene carbonate, 1-fluoro-2-ethylethylene carbonate, 1-fluoro-2-(fluoromethyl)ethylene carbonate, 1-fluoro-2-(difluoromethyl)ethylene carbonate, and 1-fluoro-2-(trifluoromethyl)ethylene carbonate may be exemplified. Among these, in order for an effect due to the compound B such as an increase in conductivity to be exhibited suitably, DFEC is preferable.

As another example of the compound B, a structure in which one of $R_2$ and $R_3$ is an alkyl group having 4 carbon atoms or less and the other is a fluorinated alkyl group having 4 carbon atoms or less, a structure in which both $R_2$ and $R_3$ are an alkyl group having 4 carbon atoms or less, a structure in which both $R_2$ and $R_3$ are a fluorinated alkyl group having 4 carbon atoms or less and the like may be exemplified. As a specific example of the compound B, 1,2-dimethylethylene carbonate, 1,2-diethyl ethylene carbonate, 1-fluoromethyl-2-methylethylene carbonate, 1-difluoromethyl-2-methylethylene carbonate, 1-trifluoromethyl-2-methylethylene carbonate, 1-fluoromethyl-2-(fluoromethyl)ethylene carbonate, and 1-difluoromethyl-2-(fluoromethyl)ethylene carbonate may be exemplified.

The nonaqueous electrolyte solution disclosed here may include one of the cyclic carbonates described above alone and may include two or more thereof in combination. When a combination of such a cyclic carbonate and the fluorinated carboxylic acid ester is included in the nonaqueous electrolyte solution, it is possible to prevent oxidative decomposition of a nonaqueous electrolyte solution in the positive electrode, and it is possible to realize a nonaqueous electrolyte solution having high conductivity and a high performance nonaqueous electrolyte secondary battery.

The nonaqueous electrolyte solution disclosed here may further include a compound C represented by the following general formula (C) and a compound D represented by the following general formula (D) as an additive. When a combination of the compound C which is a saturated cyclic carboxylic anhydride and the compound D which is an unsaturated cyclic carboxylic anhydride is included in the nonaqueous electrolyte solution, it is possible to further improve cycle durability of a secondary battery produced using the nonaqueous electrolyte solution.

<Saturated Cyclic Carboxylic Anhydride (Compound C)>

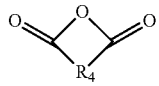

(C)

Here, $R_4$ constituting a heterocycle in the compound C is an alkylene group that has 2 to 8 carbon atoms and may have substituents.

In the compound C, an alkylene group may be linear or branched. For example, a compound C in which the number of carbon atoms of $R_4$ is 2 to 6, for example, 2 to 4, and typically 2 or 3 can be preferably used. As the linear alkylene group having 2 to 8 carbon atoms, an ethylene group, a trimethylene group, a tetramethylene group, a pentamethylene group, a hexamethylene group, a heptamethylene group and the like may be exemplified. As the branched alkylene group, a propylene group, an isopyrene group, an isobutylene group, a 2-methyltrimethylene group, an isohexylene group and the like may be exemplified. In the alkylene group, one or a plurality of hydrogen atoms may be optionally substituted with a substituent such as a halogen group, a nitro group, an isocyanate group, a cyanate group, an ester group, a ketone group, an alkyl ether group, and a cyano group. However, the number of other substituents is preferably 2 or less in one molecule and more preferably 1 or less in one molecule.

As one preferable example of the compound C, succinic anhydride (SA), glutaric anhydride, citraconic anhydride, glutaconic anhydride, itaconic anhydride, diglycolic anhydride, 1,2-cyclohexanedicarboxylic anhydride, 4-cyclohexene-1,2-dicarboxylic anhydride, 5-norbornene-2,3-dicarboxylic anhydride, 3-methyl-4-cyclohexene-1,2-dicarboxylic anhydride, phenylsuccinic anhydride, 2-phenylglutaric anhydride, 2,2-dimethylsuccinic anhydride, allylsuccinic anhydride, monofluorosuccinic anhydride, trifluoromethyl succinic anhydride, and tetrafluorosuccinic anhydride may be exemplified. Among these, in order for an effect due to the compound C such as improvement in cycle durability to be exhibited suitably, a succinic anhydride in which $R_4$ is an ethylene group ($-CH_2CH_2-$) is preferable.

The nonaqueous electrolyte solution disclosed here may include one of the compounds C described above which are saturated cyclic carboxylic anhydrides alone or may include a combination of two or more thereof.

<Unsaturated Cyclic Carboxylic Anhydride (Compound D)>

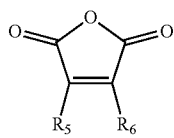

(D)

Here, in the compound D, $R_5$ and $R_6$ each are independently selected from the group consisting of a hydrogen atom, a fluorine atom, and an alkyl group or aryl group optionally substituted with fluorine atoms. Alternatively, $R_5$ an $R_6$ may be bonded to each other to form an aromatic ring or an aliphatic ring.

In the compound D, at least one of the two substituents $R_5$ and $R_6$ on carbon atoms constituting a heterocycle, for example, both, may be an alkyl group or an aryl group. $R_5$ and $R_6$ may be linear or branched. For example, a compound D in which the total number of carbon atoms of $R_5$ and $R_6$ is 1 to 12 can be preferably used. In addition, a compound D in which the total number of carbon atoms of $R_5$ and $R_6$ is 1 to 6, and typically 1 to 4, for example, 1 or 2, can be used. For example, $R_5$ and $R_6$ may be an alkyl group having 1 to 6 carbon atoms, for example, 1 to 4 carbon atoms, and typically 1 or 2 carbon atoms. As the alkyl group having 1 to 6 carbon atoms, a methyl group, an ethyl group, an n-propyl group, an isopropyl group, an n-butyl group, an isobutyl group, a sec-butyl group, a t-butyl group, an n-pentyl group, a 1-methylbutyl group, a 2-methylbutyl group, a 3-methylbutyl group, a 1-methyl-2-methylpropyl group, a 2,2-dimethylpropyl group, and a hexyl group may be exemplified. In addition, a group having a structure in which one or more hydrogen atoms of an alkyl chain skeleton are substituted with a fluorine atom, that is, a fluorinated alkyl group having 1 to 6 carbon atoms, may be used. When the fluorinated alkyl group is used, the number of fluorine atoms is not particularly limited as long as one or more fluorine atoms are included in the alkyl chain skeleton, and is suitably 1 to 12, and may be 1 to 7, for example, 1 to 5, and typically 1 to 3.

As one preferable example of the compound D, a structure in which one of $R_5$ and $R_6$ is a hydrogen atom and the other is a fluorine atom, a structure in which one of $R_5$ and $R_6$ is a hydrogen atom and the other is an alkyl group having 4 carbon atoms or less, a structure in which one of $R_5$ and $R_6$ is a hydrogen atom and the other is a fluorinated alkyl group having 4 carbon atoms or less, a structure in which both $R_5$ and $R_6$ are a hydrogen atom, and the like may be exemplified. As a specific example of the compound D, maleic anhydride (MA), methyl maleic anhydride (citraconic anhydride), 2,3-dimethyl maleic anhydride, ethyl maleic anhydride, fluoromethyl maleic anhydride, trifluoromethyl maleic anhydride, fluoromaleic anhydride, and the like may be exemplified. Among these, in order for an effect due to the compound D such as improvement in cycle durability to be exhibited suitably, maleic anhydride is preferable.

As another example of the compound D, a structure in which one of $R_5$ and $R_6$ is a fluorine atom and the other is an alkyl group having 4 carbon atoms or less, a structure in which one of $R_5$ and $R_6$ is a fluorine atom and the other is a fluorinated alkyl group having 4 carbon atoms or less, a structure in which both $R_5$ and $R_6$ are a fluorine atom, a structure in which one of $R_5$ and $R_6$ is an alkyl group having 4 carbon atoms or less and the other is a fluorinated alkyl group having 4 carbon atoms or less, a structure in which both $R_5$ and $R_6$ are an alkyl group having 4 carbon atoms or less, a structure in which both $R_5$ and $R_6$ are a fluorinated alkyl group having 4 carbon atoms or less, and the like may be exemplified. As a specific example of the compound D, difluoromaleic anhydride, 2-fluoro-3-methyl maleic anhydride, and the like may be exemplified.

As another example of the compound D, a structure in which one of $R_5$ and $R_6$ is a hydrogen atom and the other is an aryl group, a structure in which one of $R_5$ and $R_6$ is a fluorine atom and the other is an aryl group, a structure in which one of $R_5$ and $R_6$ is an alkyl group optionally substituted with fluorine atoms and the other is an aryl group, a structure in which both $R_5$ and $R_6$ are an aryl group, and the like may be exemplified. As a specific example of the compound D, phenyl maleic anhydride, 2,3-diphenyl maleic anhydride, and the like may be exemplified.

In the compound D, the two substituents $R_5$ and $R_6$ on carbon atoms constituting a heterocycle may be bonded to each other to form an aromatic ring or an aliphatic ring. As a specific example of the compound D, 1-cyclohexene-1,2-dicarboxylic anhydride, 1-cyclopentene-1,2-dicarboxylic anhydride, phthalic anhydride, 1,2-naphthalic anhydride, tetrafluorophthalic anhydride and the like may be exemplified.

The nonaqueous electrolyte solution disclosed here may include one of the compounds D described above alone or may include a combination of two or more thereof. When a combination of the compound D and the compound C is included in the nonaqueous electrolyte solution, it is possible to further improve cycle durability of a secondary battery produced using the nonaqueous electrolyte solution. The reasons why such effects are obtained need not be considered to be limited, but, for example, can be conceived to be the following. That is, the nonaqueous electrolyte solution including the fluorinated carboxylic acid ester and the cyclic carbonate has excellent ion conductivity, but reduction resistance is likely to be decreased. Therefore, when charging and discharging are repeated, a decomposition reaction of the nonaqueous electrolyte solution occurs in the negative electrode, and cycle durability may decrease. On the other hand, in the nonaqueous electrolyte solution including the compound C and the compound D, a high quality coating containing components derived from the compound C and the compound D is formed on the surface of the negative electrode during initial charging. Due to the coating, the decomposition reaction in the negative electrode may be prevented. It is thought that this contributes to improving cycle durability.

The content of the compound C is suitably, for example, 0.005 mass % or more, with respect to the total mass of the nonaqueous electrolyte solution. In order to improve cycle durability and the like, the content of the compound C is preferably 0.01 mass % or more, more preferably 0.05 mass % or more, most preferably 0.1 mass % or more, and particularly preferably 0.5 mass % or more. An upper limit of the content of the compound C is not particularly limited. However, in consideration of solubility and the like, usually the upper limit is suitably 10 mass % or less, preferably 5 mass % or less, more preferably 3 mass % or less, and most preferably 2 mass % or less. For example, the technology disclosed here can be preferably realized in a form in which the content of the compound C is 0.005 mass % or more and 10 mass % or less, and typically 0.5 mass % or more and 2 mass % or less.

The content of the compound D is suitably, for example, 0.005 mass % or more, with respect to the total mass of the nonaqueous electrolyte solution. In order to improve cycle durability and the like, the content of the compound D is preferably 0.01 mass % or more, more preferably 0.05 mass % or more, most preferably 0.1 mass % or more, and particularly preferably 0.5 mass % or more. An upper limit of the content of the compound D is not particularly limited. In consideration of solubility and the like, usually the upper limit is suitably 10 mass % or less, preferably 5 mass % or less, more preferably 3 mass % or less, most preferably 2 mass % or less, and particularly preferably 1 mass % or less. For example, the technology disclosed here can be prefer-ably realized in a form in which the content of the compound D is 0.005 mass % or more and 10 mass % or less, and typically 0.5 mass % or more and 2 mass % or less.

The mixing ratio between the compound C and the compound D in the nonaqueous electrolyte solution is not particularly limited. However, the content ratio of the compound D with respect to the compound C (compound D/compound C) is suitably about 5 or less, preferably 4 or less, more preferably 3.5 or less, most preferably 3 or less, and particularly preferably 2 or less. In addition, the content ratio is suitably about 0.1 or more, preferably 0.2 or more, more preferably 0.3 or more, most preferably 0.4 or more, and particularly preferably 0.5 or more.

The nonaqueous electrolyte solution disclosed here may include a film forming agent (a third film forming agent) in addition to the compound C and the compound D. As an example of such a third film forming agent, lithium difluoro(oxalato)borate (LiDFOB), lithium bis(oxalato)borate (LiBOB), vinylene carbonate (VC), monofluoroethylene carbonate (MFEC), 1,3-propane sultone (PS), and the like may be exemplified. Among these, LiDFOB and LiBOB are preferable. The amount of the third film forming agent is suitably, for example, 50 mass % or less, and, for example, 1 mass % to 50 mass %, preferably 35 mass % or less, and, for example, 10 mass % to 35 mass %, with respect to the total mass of the film forming agent included in the nonaqueous electrolyte solution.

As described above, since the nonaqueous electrolyte solution disclosed here has excellent oxidation resistance and has high conductivity as described above, it can be preferably used as a component of various forms of lithium ion secondary batteries. A lithium ion secondary battery can be produced in the same processes as in the related art except that the fluorinated carboxylic acid ester and cyclic carbonate disclosed here are used as a nonaqueous solvent of an electrolyte solution. Although it is not intended to particularly limit a configuration, a lithium ion secondary battery schematically shown in FIG. 1 has been exemplified as a schematic configuration of a secondary battery including the nonaqueous electrolyte solution according to the present embodiment, but this is not intended to limit the objects of the present disclosure.

A lithium ion secondary battery 100 shown in FIG. 1 has a configuration in which a wound electrode body 80 in which a positive electrode sheet 10 and a negative electrode sheet 20 are wound flat with a separator sheet 40 therebetween is accommodated in a flat box-shaped battery case 50 together with a nonaqueous electrolyte solution (not shown).

The battery case 50 includes a battery case body 52 having a flat rectangular parallelepiped shape (box shape) having an upper end that is open and a lid 54 for closing the opening. As a material of the battery case 50, a relatively light metal such as aluminum and an aluminum alloy can be preferably used. On the upper surface (the lid 54) of the battery case 50, a positive electrode terminal 70 for external connection which is electrically connected to a positive electrode of the wound electrode body 80 and a negative electrode terminal 72 which is electrically connected to a negative electrode of the wound electrode body 80 are provided. Similarly to a battery case of a lithium ion secondary battery of the related art, a safety valve 55 for discharging a gas generated inside the battery case 50 to the outside of the case 50 is provided on the lid 54.

The flat wound electrode body 80 is accommodated inside the battery case 50 together with the nonaqueous electrolyte solution (not shown). The wound electrode body 80 includes the long sheet-like positive electrode (positive electrode sheet) 10 and the long sheet-like negative electrode (negative electrode sheet) 20.

<Positive Electrode>

The positive electrode sheet 10 includes an elongated positive electrode current collector and a positive electrode active material layer 14 that is formed on at least one surface, and typically on both surfaces in a longitudinal direction. The positive electrode sheet 10 can be produced, for example, by applying a composition obtained by dispersing a forming component of a positive electrode active material layer in a suitable solvent such as N-methyl-2-pyrrolidone to a surface of the positive electrode current collector and performing drying. The forming component of the positive electrode active material layer can include a positive electrode active material, and as necessary, a conductive material and a binder (binding agent). In addition, as the positive electrode current collector, a conductive member made of a metal having favorable conductivity such as aluminum, nickel, titanium, and stainless steel can be suitably used.

In the positive electrode of the lithium ion secondary battery disclosed here, the upper limit of the operation potential in a range of a state of charge (SOC) of 0% to 100% is 4.3 V or more, preferably 4.35 V or more, more preferably 4.6 V, and most preferably 4.9 V or more with reference to lithium metal. Generally, when the SOC is between 0% and 100%, the operation potential is the highest at an SOC of 100%. Therefore, usually, it is possible to determine the upper limit of the operation potential of the positive electrode through the operation potential of the positive electrode at and SOC of 100%, that is, in a fully charged state. Here, in the technology disclosed here, typically, the upper limit of the operation potential of the positive electrode in a range of an SOC of 0% to 100% can be preferably applied to a lithium ion secondary battery of 4.3 V or more and 5.5 V or less with reference to lithium metal, for example, 4.9 V or more and 5.2 V or less.

The positive electrode having such an upper limit of the operation potential can be suitably realized using a positive electrode active material of which the operation potential has a maximum value of 4.3 V (vs Li/Li$^+$) or more in a range of an SOC of 0% to 100%. More specifically, a positive electrode active material having an operation potential at an SOC of 100% with reference to lithium metal which exceeds 4.3 V, preferably 4.5 V or more, more preferably 4.6 V or more, and most preferably 4.9 V or more is preferably used. When a positive electrode active material having the above operation potential is used, it is possible to realize a higher energy density. In addition, in a positive electrode having such a high potential, when methyl difluoroacetate and a cyclic carbonate are used in the nonaqueous electrolyte solution, it is possible to suitably prevent side reactions in the positive electrode.

Here, the operation potential of the positive electrode active material can be measured, for example, as follows. That is, first, a positive electrode including a positive electrode active material serving as a measurement subject is set as a working electrode (WE), and a three-electrode cell is produced using the working electrode, a counter electrode (CE) and a lithium metal reference electrode (RE) and a nonaqueous electrolyte solution. Next, the SOC of the cell is adjusted from 0 to 100% in 5% increments based on a theoretical capacity of the cell. The SOC can be adjusted by performing constant current charging between WE-CE using, for example, a general charging and discharging device or a potentiostat. Then, a cell adjusted to be in each SOC state is left for 1 hour, the potential between WE-RE is then measured, and the potential is set as an operation potential (vs Li/Li$^+$) of the positive electrode active material in the SOC state.

As an example of the positive electrode active material capable of suitably realizing such a high potential, a lithium manganese composite oxide having a spinel structure may be exemplified. More specifically, as a preferable aspect, a lithium nickel manganese composite oxide having a spinel structure containing Li, Ni, and Mn as constituent metal elements may be exemplified. More specifically, a lithium nickel manganese composite oxide having a spinel structure represented by the following general formula (I): $Li_x(Ni_yMn_{2-y-z}Me^1{}_z)O_{4+\alpha}$ (I) may be exemplified. Here, $Me^1$ may be any transition metal element or typical metal element other than Ni and Mn, and may be, for example, one or more selected from among Fe, Ti, Co, Cu, Cr, Zn and Al. Alternatively, one or more semi-metallic elements selected from among B, Si and Ge or non-metallic elements may be used. In addition, x is 0.8≤x≤1.2, y is 0<y, z is 0≤z, and y+z<2, typically y+z≤1; α is −0.2≤α≤0.2 and is a value determined to satisfy charge neutral conditions. In a preferable aspect, y is 0.2≤y≤1.0, more preferably 0.4≤y≤0.6, for example, 0.45≤y≤0.55; z is 0≤z<1.0, for example, 0≤z≤0.3. As a specific example of the lithium nickel manganese composite oxide represented by the general formula, $LiNi_{0.5}Mn_{1.5}O_4$ may be exemplified. The lithium nickel manganese composite oxide having a spinel structure can contribute to increasing the energy density of the battery. Here, determination of whether a compound (oxide) has a spinel structure can be performed by, for example, X-ray structural analysis, and preferably single crystal X-ray structural analysis. Specifically, determination can be performed by X-ray diffraction measurement in which CuKα rays are used.

As another example of the positive electrode active material disclosed here, typically, a lithium transition metal composite oxide having a layered structure represented by the general formula $LiMe^2O_2$ may be exemplified. Here, $Me^2$ includes at least one of transition metal elements such as Ni, Co, and Mn, and may further include another metal element or non-metallic element. The lithium transition metal composite oxide having a layered structure can contribute to increasing a capacity of the battery.

As another example of the positive electrode active material disclosed here, a lithium transition metal compound such as a phosphate having an olivine type structure represented by the general formula: $LiMe^3PO_4$ may be exemplified. Here, $Me^3$ includes at least one of transition metal elements such as Mn, Fe, and Co and may further include another metal element or non-metallic element. As a specific example, $LiMnPO_4$, $LiFePO_4$, $LiCoPO_4$ and the like may be exemplified.

As another example of the positive electrode active material disclosed here, a solid solution of $LiMe^2O_2$ and $Li_2Me^4O_3$ may be exemplified. Here, $LiMe^2O_2$ indicates a composition represented by the general formula described above. In addition, $Me^4$ in $Li_2Me^4O_3$ includes at least one of transition metal elements such as Mn, Fe, and Co, and may further include another metal element or non-metallic element. As a specific example, $Li_2MnO_3$ and the like may be exemplified. As a specific example of the solid solution, a solid solution represented by $0.5LiNi_{1/3}Co_{1/3}Mn_{1/3}O_2$-$0.5Li_2MnO_3$ may be exemplified.

The positive electrode active material described above can be used alone or in combination of two or more thereof. More specifically, the positive electrode active material preferably includes a lithium nickel manganese composite oxide having a spinel structure represented by the general formula (I) at a proportion of 50 mass % or more, typically 50 to 100 mass %, for example, 70 to 100 mass %, and preferably 80 to 100 mass %, with respect to the total amount of positive electrode active material used, and a positive electrode active material including substantially only a lithium nickel manganese composite oxide having a spinel structure is more preferable.

In the technology disclosed here, the positive electrode active material is preferably in a particle form with an average particle size of 1 μm to 20 μm, and typically 2 μm to 15 μm. Here, unless otherwise specified, the average particle size in this specification refers to a particle size ($D_{50}$: median diameter) corresponding to a cumulative frequency of 50 volume % from the fine particles end having a small particle size in a volume-based particle size distribution based on a laser diffraction and light scattering method.

<Other Components Constituting Positive Electrode Active Material Layer>

The positive electrode active material layer can include an additive such as a conductive material and a binder (binding material) as necessary in addition to the positive electrode active material. As the conductive material, a conductive powder material such as carbon powder and carbon fibers is preferably used. As the carbon powder, various carbon blacks (CB), for example, acetylene black (AB), are preferable.

As the binder, various polymeric materials may be exemplified. For example, when an aqueous composition for which a dispersion medium is water or a solvent mixture mainly containing water is used to form a positive electrode active material layer, it is possible to use a water-soluble or water-dispersible polymeric material. As the water-soluble or water-dispersible polymeric material, a cellulose-based polymer such as carboxymethyl cellulose (CMC), a fluororesin such as polytetrafluoroethylene (PTFE), and a rubber such as styrene butadiene rubber (SBR) may be exemplified. Alternatively, when a solvent-based composition for which a dispersion medium is mainly an organic solvent is used to form a positive electrode active material layer, a polymeric material, for example, a halogenated vinyl resin such as polyvinylidene fluoride (PVdF), and a polyalkylene oxide such as polyethylene oxide (PEO), can be used. The binder can be used alone or in combination of two or more thereof. Here, the polymeric material exemplified above can be used as another additive such as a thickener or a dispersant in addition to as a binder.

The proportion of the positive electrode active material in the entire positive electrode active material layer is suitably about 50 mass % or more, and typically 50 mass % to 97 mass %, and usually 70 mass % to 95 mass %, for example, preferably 75 mass % to 95 mass %. In addition, when the conductive material is used, the proportion of the conductive material in the entire positive electrode active material layer can be about 2 mass % to 20 mass %, and usually preferably about 2 mass % to 15 mass %. In addition, when the binder is used, the proportion of the binder in the entire positive electrode active material layer can be about 0.5 mass % to 10 mass %, and usually preferably about 1 mass % to 5 mass %.

<Negative Electrode>

The negative electrode sheet 20 includes an elongated negative electrode current collector and a negative electrode active material layer 24 that is formed on at least one surface in a longitudinal direction. The negative electrode sheet 20 can be produced, for example, by applying a composition obtained by dispersing a forming component of a negative electrode active material layer in a suitable solvent such as water to a surface of the negative electrode current collector and performing drying. The forming component of the negative electrode active material layer can include a negative electrode active material and as necessary, a binder and the like. In addition, as the negative electrode current collector, a conductive material made of a metal having favorable conductivity such as copper, nickel, titanium, and stainless steel can be suitably used.

As the negative electrode active material, one or more types of material used in a lithium ion secondary battery in the related art can be used without particular limitation. As an example of the negative electrode active material, for example, a carbon material, may be exemplified. As representative examples of the carbon material, graphite carbon (graphite), amorphous carbon, and the like may be exemplified. A carbon material (carbon particles) in the form of particles at least a part of which has a graphite structure (layered structure), is preferably used. More specifically, a carbon material including natural graphite as a main component is preferably used. The natural graphite may be obtained by spherically shaping scaly graphite. In addition, carbonaceous powder in which amorphous carbon is applied to a surface of graphite may be used. In addition, as the negative electrode active material, a metal oxide material such as a silicon oxide, a titanium oxide, a vanadium oxide, and a lithium titanium composite oxide (LTO), a metal nitride material such as lithium nitride, a lithium cobalt composite nitride, and a lithium nickel composite nitride, single substances such as silicon and tin, and alloys thereof, and compounds and composite materials including the above materials in combination can be used. More specifically, a negative electrode active material having a reduction potential (vs $Li/Li^+$) that is about 0.5 V or less, for example, 0.2 V or less, and typically 0.1 V or less, is preferably used. When the negative electrode active material having this reduction potential is used, it is possible to realize a higher energy density. As a material capable of obtaining such a low potential, a natural graphite-based carbon material may be exemplified. In the technology disclosed here, the negative electrode active material preferably has an average particle size of 10 μm to 30 μm, and typically 15 μm to 25 μm.

<Other Components Constituting Negative Electrode Active Material Layer>

The negative electrode active material layer can include an additive such as a binder (binding material) and a thickener as necessary in addition to the negative electrode active material. As the binder and the thickener to be used in the negative electrode active material layer, the same as those described in the positive electrode active material layer can be used.

The proportion of the negative electrode active material in the entire negative electrode active material layer exceeds about 50 mass %, and is about 80 to 99.5 mass %, and, for example, preferably 90 to 99 mass %. In addition, the proportion of the binder in the entire negative electrode active material layer is about 0.5 to 5 mass %, and, for example, preferably 1 to 2 mass %. In addition, the proportion of the thickener in the entire negative electrode active material layer is about 0.5 to 5 mass %, and, for example, preferably 1 to 2 mass %.

Two long sheet-like separators (separator sheets) 40 are disposed between the positive electrode active material layer 14 and the negative electrode active material layer 24 as insulating layers for preventing direct contact therebetween. As the separator sheet 40, a porous sheet, a nonwoven fabric, or the like made of a resin including polyethylene (PE), polypropylene (PP), polyester, cellulose, a polyamide, or the like, can be used.

The wound electrode body 80 can be produced by, for example, winding a laminate in which the positive electrode sheet 10, the separator sheet 40, the negative electrode sheet 20, and the separator sheet 40 are laminated in that order in a longitudinal direction, pressing and squeezing the obtained wound body in a lateral direction, and forming a flat shape.

In a width direction defined as a direction from one end to the other end of the wound electrode body 80 in the winding axis direction, in the central portion thereof, a wound core portion in which the positive electrode active material layer 14 formed on the surface of the positive electrode current collector and the negative electrode active material layer 24 formed on the surface of the negative electrode current collector are superimposed and densely laminated is formed. In addition, at both ends of the wound electrode body 80 in the winding axis direction, a positive electrode active material layer non-forming portion of the positive electrode sheet 10 and a negative electrode active material layer non-forming portion of the negative electrode sheet 20 protrude from the wound core portion to the outside. Thus, a positive electrode current collector plate is attached to a protruding portion on the positive electrode side and a negative electrode current collector plate is attached to a protruding portion on the negative electrode side, and they are electrically connected to the positive electrode terminal 70 and the negative electrode terminal 72, respectively.

<Method of Producing Lithium Ion Secondary Battery>

The lithium ion secondary battery 100 having such a configuration can be produced through a battery assembly production process and an initial charging process.

<Battery Assembly Production Process>

In the battery assembly production process, the wound electrode body 80 including the positive electrode sheet 10 and the negative electrode sheet 20 is accommodated in a battery case together with a nonaqueous electrolyte solution to produce a battery assembly. Here, the battery assembly refers to a battery assembled into a form before an initial charging process is performed in the battery production process. The battery assembly can be produced by, for example, accommodating the wound electrode body 80 therein from the opening of the battery case 50, attaching the lid 54 to the opening of the case 50, injecting a nonaqueous electrolyte through an injection hole (not shown) provided in the lid 54, and then sealing the injection hole by welding or the like. In the embodiment, the nonaqueous electrolyte solution accommodated in the battery assembly includes the fluorinated carboxylic acid ester and the cyclic carbonate as a nonaqueous solvent. In addition, the nonaqueous electrolyte solution includes the compound C and the compound D as an additive.

<Initial Charging Process>

In the initial charging process, initial charging is performed on the battery assembly. Typically, an external power supply is connected between the positive electrode (positive electrode terminal) and the negative electrode (negative electrode terminal) of the battery assembly, and charging is performed to a predetermined voltage range. Typically, charging refers to constant current charging. Thus, a high quality coating including components derived from the compound C and the compound D is formed on the surface of the negative electrode.

A voltage during initial charging may be set so that, for example, the compound C and the compound D are electrically decomposed. As an example, when the negative electrode active material is a carbon material, charging is performed until a voltage between the positive and negative electrode terminals becomes about 3 V or more, and typically 3.5 V or more, and, for example, 4 V to 5 V. The charging may be performed by a method (CC charging) in which constant current charging is performed from when charging starts until a voltage of the battery reaches a predetermined value, and may be performed by a method (CC-CV charging) in which constant voltage charging is performed after the predetermined voltage has been reached. In addition, a charging rate during constant current charging may be generally 1 C or less, preferably 0.1 C to 0.2 C. According to the findings by the inventors, when charging is performed at a low rate of 1 C or less, the compound C and the compound D are decomposed relatively gently. Thus, for example, the coating including components of the compound C and the compound D is formed on the surface of the negative electrode so that it has suitable compactness and low resistance, and sufficient suppression of reactivity with the nonaqueous electrolyte solution is possible. Accordingly, it is possible to exhibit effects of this configuration to a higher degree. Here, charging can be performed once, and, for example, can be performed twice or more with discharging therebetween.

In this manner, the lithium ion secondary battery 100 according to the present embodiment can be produced.

The lithium ion secondary battery disclosed here can be used for various applications and is characterized by excellent conductivity of the nonaqueous electrolyte solution. Thus, utilizing such an advantage, the lithium ion secondary battery can be preferably used for applications for which high performance such as low resistance is required. As such applications, for example, a driving power supply mounted in a vehicle such as a plug-in hybrid vehicle, a hybrid vehicle, or an electric vehicle may be exemplified. Here, typically, the secondary battery can be used in the form of an assembled battery in which a plurality of batteries are connected in series and/or in parallel.

While several examples related to the present disclosure will be described below, this is not intended to limit the present disclosure to such examples.

Test Example 1

<Nonaqueous Electrolyte Solution>

A plurality of types of solvent mixture (nonaqueous solvent) having different compositions and volume ratios were prepared. $LiPF_6$ as a supporting salt at a concentration of about 1 mol/L was mixed into these solvent mixtures to prepare nonaqueous electrolyte solutions of Examples 1 to 22. The compositions and volume ratios of the solvent mixtures used in the nonaqueous electrolyte solutions according to the examples are summarized in Table 1. Here, in Table 1, MDFA is methyl difluoroacetate corresponding to $R_7=CHF_2$, $R_8=CH_3$ in the following general formula (E), M2FP is a compound corresponding to $R_7=CHFCH_3$, $R_8=CH_3$, M333TFP is a compound corresponding to $R_7=CH_2CF_3$, $R_8=CH_3$, M2333TFP is a compound corresponding to $R_7=CHFCF_3$, $R_8=CH_3$, DMC is a compound corresponding to $R_7=OCH_3$, $R_8=CH_3$, EMC is a compound corresponding to $R_7=OCH_3$, $R_8=CH_2CH_3$, TFEMC is a compound corresponding to $R_7=OCH_3$, $R_8=OCH_2CF_3$, and DEC is a compound corresponding to $R_7=OCH_2CH_3$, $R_8=CH_2CH_3$. In addition, EC in Table 1 is a compound corresponding to $R_2=H$, $R_3=H$ in the general formula (B), PC is a compound corresponding to $R_2=CH_3$, $R_3$=H, MFEC is a compound corresponding to $R_2$=F, $R_3$=H, DFEC is a compound corresponding to $R_2$=F, $R_3$=F, FPC is a compound corresponding to $R_2$=CH$_2$F, $R_3$=H, and TFPC is a compound corresponding to $R_2$=CF$_3$, $R_3$=H.

(E)

<Measurement of Conductivity>

In addition, conductivities of the nonaqueous electrolyte solutions of the examples were measured. The conductivity was measured using a conductivity meter SevenMulti (commercially available from Mettler Toledo International Inc.) at 25° C. The results are shown in a column of Table 1.

TABLE 1

| | Nonaqueous solvent | Volume ratio (vol. %) | Conductivity (mS/cm) |
|---|---|---|---|
| Example 1 | TFPC + MDFA | 30:70 | 10.9 |
| Example 2 | TFPC + M2FP | 30:70 | 9.6 |
| Example 3 | TFPC + M333TFP | 30:70 | 6.3 |
| Example 4 | TFPC + M2333TFP | 30:70 | 4.4 |
| Example 5 | TFPC + MDFA | 10:90 | 11.6 |
| Example 6 | MFEC + MDFA | 5:95 | 12.3 |
| Example 7 | MFEC + MDFA | 10:90 | 13.6 |
| Example 8 | MFEC + MDFA | 30:70 | 12.5 |
| Example 9 | MFEC + MDFA | 50:50 | 11.2 |
| Example 10 | EC + MDFA | 5:95 | 13.0 |
| Example 11 | EC + MDFA | 10:90 | 14.0 |
| Example 12 | EC + MDFA | 30:70 | 13.9 |
| Example 13 | EC + MDFA | 50:50 | 12.7 |
| Example 14 | PC + MDFA | 10:90 | 13.5 |
| Example 15 | FPC + MDFA | 10:90 | 10.9 |
| Example 16 | DFEC + MDFA | 10:90 | 11.3 |
| Example 17 | EC + DMC + EMC | 30:40:30 | 11.2 |
| Example 18 | EC + DEC | 50:50 | 8.2 |
| Example 19 | EC + TFEMC | 50:50 | 6.0 |
| Example 20 | TFPC + DMC | 30:70 | 9.1 |
| Example 21 | TFPC + TFEMC | 30:70 | 3.1 |
| Example 22 | MFEC + TFEMC | 30:70 | 4.2 |

As shown in Table 1, in the nonaqueous electrolyte solution of Example 1 in which MDFA (methyl difluoroacetate) and TFPC (cyclic carbonate) were used, the conductivity of the nonaqueous electrolyte solution was improved compared to Examples 2 to 4 in which another fluorinated carboxylic acid ester and TFPC were used. Accordingly, it was confirmed that, when the fluorinated carboxylic acid ester having two fluorine atoms on the alpha carbon atom derived from a carboxylic acid and TFPC were used, oxidation resistance was improved and an effect of improving conductivity was exhibited. Here, comparing Examples 6 to 13, when the proportion of MDFA was too high or too low, conductivity was likely to decrease. In consideration of conductivity, the volume ratio between cyclic carbonate:MDFA is 50:50 to 5:95, and preferably 30:70 to 10:90.

Test Example 2

In this example, laminated cells (lithium ion secondary batteries) were produced using nonaqueous electrolyte solutions having different compositions and different amounts of additives added, and performances thereof were evaluated.

<Production of Laminated Cell>

A positive electrode of a laminated cell was produced as follows. First, lithium nickel cobalt manganese composite oxide (LiNi$_{1/3}$Co$_{1/3}$Mn$_{1/3}$O$_2$) powder having a layered structure as a positive electrode active material, AB as a conductive material, and PVdF as a binder were mixed into NMP at the mass ratio of positive electrode active material:conductive material:binder (87:10:3) to prepare a composition for forming a positive electrode active material layer. The composition for forming a positive electrode active material layer was applied to one surface of a long sheet-like aluminum foil (positive electrode current collector) and dried to produce a positive electrode in which the positive electrode active material layer was provided on one surface of the positive electrode current collector.

A negative electrode of the laminated cell was produced as follows. First, natural graphite as a negative electrode active material, SBR as a binder, and CMC as a thickener were dispersed in water at the mass ratio of negative electrode active material:binder:thickener (98:1:1) to prepare a composition for a negative electrode active material layer. The composition for a negative electrode active material layer was applied to one surface of a long sheet-like copper foil (negative electrode current collector) and dried to produce a negative electrode in which the negative electrode active material layer was provided on one surface of the negative electrode current collector.

As a separator of the laminated cell, a separator made of a base material including a microporous film (PP/PE/PP film) having a three-layer structure of polypropylene/polyethylene/polypropylene was prepared.

The prepared positive electrode, negative electrode, and separator were used to produce a laminated cell. That is, the positive electrode and negative electrode produced above were laminated with the separator therebetween so that active material layers of both electrodes face each other to produce an electrode body. Next, in the battery assembly production process, the electrode body was accommodated in a laminated bag-shaped battery container together with a predetermined nonaqueous electrolyte solution to produce a battery assembly.

In laminated cells of Examples 23 to 31, compositions of nonaqueous solvents, types of additives, and amounts of additives added in the nonaqueous electrolyte solutions were different. The compositions of the nonaqueous solvents, the types of additives, and amounts of additives added used in the laminated cells according to the examples are summarized in Table 2. Here, in Table 2, TFPC, MDFA, EC, DMC, EMC, M2FP, M333TFP, M2333TFP and TFEMC are as above. In Table 2, SA is succinic anhydride corresponding to $R_4$=CH$_2$CH$_2$ in the general formula (C), and MA is maleic anhydride corresponding to $R_5$=H, $R_6$=H in the general formula (D).

In the initial charging process, charging was performed on the battery assembly at a temperature of 25° C. and at constant current of 0.2 C until the voltage reached 4.3 V, and after the voltage reached 4.3 V, charging continued to a constant voltage of 4.3 V while a current was temporarily lowered, and charging was terminated when the current reached 0.02 C, and the state was a fully charged state, that is, an SOC of 100%. In this manner, the laminated cells according to Examples 23 to 31 were produced.

After the initial charging, discharging was performed at a constant current of 0.2 C until the voltage reached 3 V, and a discharge capacity at this time was set as an initial capacity. In addition, the states of the laminated cells of the examples were adjusted to an SOC of 34% at a temperature of 25° C. Discharging was performed at a rate of 30 C for 10 seconds on the batteries adjusted to an SOC of 34%, and a voltage drop during this time was measured. The measured voltage drop amount was divided by a current value during discharging to calculate an internal resistance, which was set as an initial resistance. The results are shown in a column of initial resistance ratio in Table 2. Here, the initial resistance ratio is represented by a relative value when the initial resistance in Example 28 is set to 1.00.

<High Temperature Cycle Test>

A high temperature cycle test in which a charging and discharging cycle in which charging was performed at a constant current of 2 C until the voltage reached 4.3 V, and then discharging was performed at a constant current of 2 C until the voltage reached 3 V was continuously performed 200 times was performed on the cells of Examples 23 to 31 in a thermostatic chamber at about 50° C. Here, a capacity retention rate was calculated from an initial capacity before the high temperature cycle test was performed and a battery capacity after the high temperature cycle test. Here, the battery capacity after the high temperature cycle test was measured in the same procedure as in the initial capacity described above. In addition, the capacity retention rate was obtained by (the battery capacity after the high temperature cycle test/the initial capacity before the high temperature cycle test)×100. The results are shown in a column of capacity retention rate over 200 cycles in Table 2. In addition, a resistance increase rate was calculated from the initial resistance before the high temperature cycle test and the battery resistance after the high temperature cycle test. Here, the battery resistance after the high temperature cycle test was measured in the same procedure as in the initial resistance described above. In addition, the resistance increase rate was obtained by the battery resistance after the high temperature cycle test/the initial resistance before the high temperature cycle test. The results are shown in a column of resistance increase rate over 200 cycles in Table 2. Here, the resistance increase rate is represented by a relative value when the resistance increase rate in Example 28 is set to 1.00.

As shown in Table 2, in the laminated cells of Examples 23 to 25 using the nonaqueous electrolyte solutions in which MDFA (methyl difluoroacetate) and TFPC (cyclic carbonate) were used in combination and SA and MA were added, a capacity retention rate of 80% or more was obtained after the high temperature cycle test. In addition, the resistance increase rate was almost the same as in Example 28, and favorable results were obtained.

Test Example 3

In this example, laminated cells of Examples 32 to 36 were produced in the same manner as in Test Example 2 except that powdered lithium nickel manganese composite oxide ($LiNi_{0.5}Mn_{1.5}O_4$) having a spinel structure was used in place of $LiNi_{1/3}Co_{1/3}Mn_{1/3}O_2$ as the positive electrode active material in Test Example 2, and in the initial charging process, the upper limit voltage was changed to 4.9 V, and the lower limit voltage was changed to 3.5 V. Then, the initial resistance ratio, the capacity retention rate over 200 cycles, and the resistance increase rate over 200 cycles were measured in the same procedures as in Test Example 2. Here, in this example, in the high temperature cycle test, the upper limit voltage was set to 4.9 V, and the lower limit voltage was set to 3.5 V. The compositions of the nonaqueous solvents, types of additives, and amounts of additives added used in the laminated cells of the examples, and the initial resistance ratio, the capacity retention rate over 200 cycles, and the resistance increase rate over 200 cycles are summarized in Table 3. Here, the initial resistance ratio is represented by a relative value when the initial resistance in Example 35 is set to 1.00. In addition, the resistance increase rate is represented by a relative value when the resistance increase rate in Example 35 is set to 1.00.

TABLE 2

|  | Nonaqueous solvent | Volume ratio (vol. %) | Additive Type | Additive Amount added (mass %) | Initial resistance ratio | Capacity retention rate over 200 cycles (%) | Resistance increase rate over 200 cycles (%) |
|---|---|---|---|---|---|---|---|
| Example 23 | TFPC + MDFA | 30:70 | SA<br>MA<br>LiDFOB | 1<br>1<br>1 | 1.26 | 84 | 0.99 |
| Example 24 | TFPC + MDFA | 30:70 | SA<br>MA<br>LiDFOB | 1<br>0.5<br>1 | 1.17 | 87 | 0.98 |
| Example 25 | TFPC + MDFA | 30:70 | SA<br>MA<br>LiDFOB | 1<br>2<br>1 | 1.41 | 80 | 1.02 |
| Example 26 | TFPC + M333TFP | 30:70 | LiDFOB | 1 | 1.20 | 30 | 1.51 |
| Example 27 | TFPC + M2333TFP | 30:70 | LiDFOB | 1 | 1.25 | 54 | 1.33 |
| Example 28 | EC + DMC + EMC | 30:40:30 | — | — | 1.00 | 84 | 1.00 |
| Example 29 | TFPC + DMC | 30:70 | — | — | 1.19 | 66 | 1.04 |
| Example 30 | TFPC + TFEMC | 30:70 | — | — | 1.48 | 61 | 1.88 |
| Example 31 | TFPC + TFEMC | 30:70 | LiDFOB | 1 | 1.23 | 71 | 1.39 |

TABLE 3

| | Nonaqueous solvent | Volume ratio (vol. %) | Additive Type | Amount added (mass %) | Initial resistance ratio | Capacity retention rate over 200 cycles (%) | Resistance increase rate over 200 cycles (%) |
|---|---|---|---|---|---|---|---|
| Example 32 | TFPC + MDFA | 30:70 | SA<br>MA<br>LiDFOB | 1<br>0.5<br>1 | 0.44 | 83 | 0.55 |
| Example 33 | TFPC + M333TFP | 30:70 | LiDFOB | 1 | 0.59 | 25 | 1.50 |
| Example 34 | TFPC + M2333TFP | 30:70 | LiDFOB | 1 | 0.62 | 55 | 0.74 |
| Example 35 | EC + DMC + EMC | 30:40:30 | LiDFOB | 1 | 1.00 | 54 | 1.00 |
| Example 36 | TFPC + TFEMC | 30:70 | LiDFOB | 1 | 0.60 | 81 | 0.57 |

As shown in Table 3, when the laminated cell of Example 35 using the nonaqueous electrolyte solution including EC, DMC and EMC was used at a high potential, the nonaqueous electrolyte solution was oxidatively decomposed. Therefore, the capacity retention rate after the high temperature cycle test was low and the battery resistance tended to increase. On the other hand, in the laminated cell of Example 32 using the nonaqueous electrolyte solution in which MDFA and TFPC were used in combination and SA and MA were added, a capacity retention rate of 80% or more was obtained after the high temperature cycle test, and the result of the resistance increase rate was favorable.

While specific examples of the present disclosure have been described above in detail, these are only examples and do not limit the scope of the claims. The disclosure disclosed here may include various modifications and changes to the above specific examples.

What is claimed is:

1. A nonaqueous electrolyte solution used for a nonaqueous electrolyte secondary battery, the nonaqueous electrolyte solution comprising:

a nonaqueous solvent comprising a cyclic carbonate, a fluorinated carboxylate ester represented by the following formula A, a compound represented by the following formula C, and a compound represented by the following formula D;

wherein a volume ratio between the fluorinated carboxylate ester and the cyclic carbonate is 70:30 to 95:5;

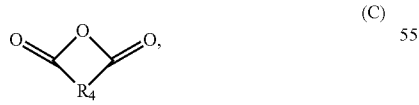

wherein, in formula C, $R_4$ is an alkylene group including two to eight carbon atoms or a substituted alkylene group including two to eight carbon atoms, and the substituent of the substituted alkylene group is selected from the group consisting of a halogen group, a nitro group, an isocyanate group, a cyanate group, an ester group, a ketone group, an alkyl ether group, and a cyano group;

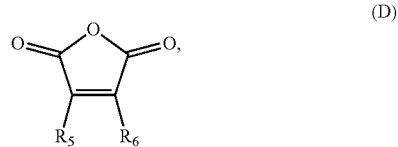

wherein, in formula D, each of $R_5$ and $R_6$ is independently selected from the group consisting of a hydrogen atom, a fluorine atom, an alkyl group, an alkyl group including fluorine atoms and an aryl group or $R_5$ and $R_6$ are bonded to each other to form an aromatic ring or an aliphatic ring;

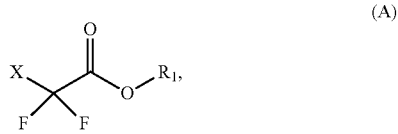

wherein, in formula A, —$R_1$ is selected from the group consisting of —$CH_3$, —$CH_2CH_3$, —$CF_2H$, —$CFH_2$, —$CF_3$, —$CH_2CF_3$, —$CH_2CF_2H$, —$CH_2CFH_2$, —$CFHCF_3$, —$CFHCF_2H$, —$CFHCFH_2$, —$CF_2CF_3$, —$CF_2CF_2H$, and —$CF_2CFH_2$, and —X is selected from the group consisting of —H, —$CF_2H$, —$CFH_2$, and —$CH_3$;

wherein a content ratio of a mass of the compound D with respect to a mass of the compound C (compound D/compound C) is 0.5 or more and 2 or less; and wherein a content of the compound represented by the formula C is 0.005 mass % or more and 10 mass % or less with respect to a total mass of the nonaqueous electrolyte solution; and a content of the compound represented by the formula D is 0.005 mass % or more and 10 mass % or less with respect to the total mass of the nonaqueous electrolyte solution.

2. The nonaqueous electrolyte solution according to claim 1, wherein the volume ratio between the fluorinated carboxylate ester and the cyclic carbonate is 70:30 to 90:10.

3. The nonaqueous electrolyte solution according to claim 1, wherein the cyclic carbonate comprises a compound represented by the following formula B:

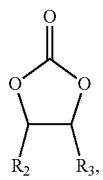

(B)

wherein, in formula B, $R_2$ and $R_3$ are the same or different substituents, and each of $R_2$ and $R_3$ is independently selected from the group consisting of a hydrogen atom, a fluorine atom, an alkyl group, and an alkyl group including fluorine atoms.

4. The nonaqueous electrolyte solution according to claim 3, wherein the cyclic carbonate comprises at least one selected from the group consisting of ethylene carbonate, monofluoroethylene carbonate, propylene carbonate, ethyl ethylene carbonate, (fluoromethyl)ethylene carbonate, (trifluoromethyl)ethylene carbonate, and 1,2-difluoroethylene carbonate.

5. The nonaqueous electrolyte solution according to claim 1, wherein the fluorinated carboxylate ester comprises at least one selected from the group consisting of $CHF_2COOCH_3$, $CH_3CF_2COOCH_3$, $CFH_2CF_2COOCH_3$, $CF_2HCF_2COOCH_3$, $CHF_2COOC_2H_5$, $CH_3CF_2COOC_2H_5$, $CFH_2CF_2COOC_2H_5$, $CF_2HCF_2COOC_2H_5$, and $CHF_2COOCH_3$.

6. The nonaqueous electrolyte solution according to claim 5, wherein the fluorinated carboxylate ester comprises $CHF_2COOCH_3$.

7. The nonaqueous electrolyte solution according to claim 1, wherein the compound represented by the formula C comprises succinic anhydride and the compound represented by the formula D comprises maleic anhydride.

8. The nonaqueous electrolyte solution according to claim 1, further comprising at least one selected from the group consisting of lithium difluoro(oxalato)borate and lithium bis(oxalato)borate.

9. A nonaqueous electrolyte secondary battery including a positive electrode, a negative electrode, and the nonaqueous electrolyte solution according to claim 1.

10. The nonaqueous electrolyte secondary battery according to claim 9, wherein the cyclic carbonate comprises a compound represented by the following formula B:

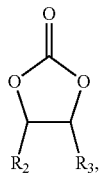

(B)

wherein, in formula B, $R_2$ and $R_3$ are the same or different substituents, and each of $R_2$ and $R_3$ is independently selected from the group consisting of a hydrogen atom, a fluorine atom, an alkyl group, and an alkyl group including fluorine atoms.

11. A method of producing a nonaqueous electrolyte secondary battery comprising:
producing a battery assembly, the battery assembly is produced by accommodating a positive electrode and a negative electrode in a battery case together with the nonaqueous electrolyte solution according to claim 1, and
performing initial charging processing on the battery assembly.

12. The nonaqueous electrolyte solution according to claim 1, wherein a content of the compound represented by the formula C is 0.5 mass % or more and 2 mass % or less with respect to a total mass of the nonaqueous electrolyte solution; and a content of the compound represented by the formula D is 0.5 mass % or more and 2 mass % or less with respect to the total mass of the nonaqueous electrolyte solution.

13. The nonaqueous electrolyte solution according to claim 1, wherein an ionic conductivity of the electrolyte solution at 25° C. is from 10.9 mS/cm to 14.0 mS/cm.

* * * * *